US009285140B2

(12) United States Patent
Melink

(10) Patent No.: US 9,285,140 B2
(45) Date of Patent: Mar. 15, 2016

(54) GROUND LOOP BYPASS FOR GROUND SOURCE HEATING OR COOLING

(75) Inventor: Stephen K. Melink, Cincinnati, OH (US)

(73) Assignee: Melink Corporation, Milford, OH (US)

(*) Notice: Subject to any disclaimer, the term of this patent is extended or adjusted under 35 U.S.C. 154(b) by 647 days.

(21) Appl. No.: 13/164,257

(22) Filed: Jun. 20, 2011

(65) Prior Publication Data
US 2012/0318491 A1 Dec. 20, 2012

(51) Int. Cl.
F25B 29/00 (2006.01)
F24J 3/08 (2006.01)
F28D 20/00 (2006.01)
G05D 23/19 (2006.01)
F24D 19/10 (2006.01)

(52) U.S. Cl.
CPC ............ *F24J 3/081* (2013.01); *F24D 19/1015* (2013.01); *F28D 20/0052* (2013.01); *G05D 23/1927* (2013.01); *F24D 2200/11* (2013.01); *F24D 2220/042* (2013.01); *F24J 2003/089* (2013.01); *Y02B 10/40* (2013.01); *Y02E 10/12* (2013.01); *Y02E 60/142* (2013.01)

(58) Field of Classification Search
CPC ............... F24J 3/08; F24J 3/081; F24J 3/083; F24J 2003/089; F24F 5/0046; F24F 5/005; Y02E 10/10; Y02E 10/12; Y02E 60/142; F28D 20/0052; F24D 19/1015; F24D 2200/11; F24D 2220/042; G05D 23/1927; Y02B 10/40; F25B 30/06
USPC ............ 165/45, 253, 218–221, 50, 293, 244, 165/247, 254, 255, 297, 103; 62/260
See application file for complete search history.

(56) References Cited

U.S. PATENT DOCUMENTS

| | | | | | |
|---|---|---|---|---|---|
| 2,513,373 | A | * | 7/1950 | Sporn | F24J 3/081 165/45 |
| 3,254,702 | A | * | 6/1966 | Thomason | F24D 11/007 165/45 |
| 3,782,132 | A | * | 1/1974 | Lohoff | 62/260 |
| 3,970,069 | A | * | 7/1976 | Pickett | 126/563 |
| 4,067,383 | A | * | 1/1978 | Padden | 165/247 |
| 4,091,636 | A | * | 5/1978 | Margen | 62/238.6 |
| 4,299,270 | A | * | 11/1981 | McGrath | F24J 3/085 165/45 |
| 4,299,277 | A | * | 11/1981 | McGregor | F24D 11/02 62/260 |
| 4,577,679 | A | * | 3/1986 | Hibshman | F24J 3/085 165/45 |
| 4,693,301 | A | * | 9/1987 | Baehrle | E01C 11/26 165/45 |
| 4,718,248 | A | * | 1/1988 | Fisher | F24D 11/0214 62/238.6 |
| 5,081,848 | A | * | 1/1992 | Rawlings et al. | 62/260 |
| 5,261,251 | A | * | 11/1993 | Galiyano | F24F 5/0046 62/185 |
| 5,461,876 | A | * | 10/1995 | Dressler | 62/160 |
| 5,651,264 | A | * | 7/1997 | Lo et al. | 62/230 |
| 5,651,265 | A | * | 7/1997 | Grenier | F25B 13/00 165/45 |
| 5,669,224 | A | * | 9/1997 | Lenarduzzi | F24J 3/081 62/238.7 |
| 5,852,939 | A | * | 12/1998 | Gazes | F24F 5/0046 62/260 |

(Continued)

Primary Examiner — Ljiljana Ciric
(74) Attorney, Agent, or Firm — Wood, Herron & Evans, LLP

(57) ABSTRACT

A ground source heat transfer system circulates transfer fluid between heat exchange units and a ground loop. The system includes a bypass which allows the transfer fluid to continue to circulate past the exchange units while bypassing the ground loop. Monitoring the conditions of the system with temperature sensors allows the system to selectively activate the bypass whenever diverting fluid away from the ground loop can save heat or energy.

16 Claims, 4 Drawing Sheets

(56) References Cited

U.S. PATENT DOCUMENTS

| | | | | |
|---|---|---|---|---|
| 5,964,101 A * | 10/1999 | Schulak | F24D 11/0214 | |
| | | | 62/238.6 | |
| 6,220,339 B1 * | 4/2001 | Krecke | F24D 11/003 | |
| | | | 165/48.2 | |
| 6,591,901 B2 * | 7/2003 | Bujak, Jr. | 165/209 | |
| 6,769,482 B2 * | 8/2004 | Wagner et al. | 165/254 | |
| 7,407,003 B2 * | 8/2008 | Ross | 165/295 | |
| 7,490,662 B2 * | 2/2009 | Eliades et al. | 165/297 | |
| 2002/0017107 A1 * | 2/2002 | Bailey | F24F 3/001 | |
| | | | 62/238.7 | |
| 2007/0298298 A1 * | 12/2007 | Ishigaki et al. | 429/24 | |
| 2008/0016895 A1 * | 1/2008 | Kim | F24F 5/0046 | |
| | | | 62/260 | |
| 2008/0289793 A1 * | 11/2008 | Geiken | F24J 2/4649 | |
| | | | 165/10 | |
| 2009/0211283 A1 * | 8/2009 | Koh | F24F 5/0017 | |
| | | | 62/259.1 | |
| 2012/0097361 A1 * | 4/2012 | Yang | F28D 15/00 | |
| | | | 165/45 | |

* cited by examiner

GROUND LOOP BYPASS FOR GROUND SOURCE HEATING OR COOLING

FIELD OF THE INVENTION

The invention is generally related to ground source heating or cooling, and more particularly to the use of ground loops to aid in thermal transfer.

BACKGROUND OF THE INVENTION

Energy conservation is an increasingly important consideration for businesses and individuals alike as energy becomes more expensive. Both heating and cooling represent a major source of energy expense, and so alternative methods of heating and cooling are becoming more popular and viable.

Geothermal ground loop heating is used to defray costs associated with heating (or cooling) air and water within a building by taking advantage of the natural temperature differential between the surface air and underground. Such systems typically include a ground loop of underground pipes largely situated below a permafrost layer such as in the earth or in a lake bed or the like, a building loop of pipes largely situated within a structure such as a building, and a fluid pump to pump a heat transfer fluid through the ground and building loops. Within the building loop, the transfer fluid is pumped through a heat exchanger where heat is extracted and used in the building. The fluid is also pumped through underground pipes of the ground loop where it absorbs more heat and carries it back into the building. A similar process can be used for cooling, the transfer fluid being used to move heat out of the building and into the cooler ground.

The fluid pump maintains a generally even and constant flow of the transfer fluid through the entire system, even during times that heat is not being exchanged, such as when the system is otherwise idle or the building is not occupied, for example. Variable-speed drives can be installed to reduce the pump speed and save energy during such idle and unoccupied periods, but the pump still needs to run at some minimum speed on a continuous basis just in case one or more of the heat exchangers is activated, so that the exchangers can use the heat capacity of the fluid.

SUMMARY OF THE INVENTION

I have discovered that operating the fluid pump to move fluid evenly through the entire system is not always necessary. Indeed, operating the pump in order for the fluid to circulate through the entire system itself consumes a significant amount of energy, and can also run the risk of moving heat in the wrong direction, such as when the ground loop is not closer to the desirable temperature than is the building temperature, for example. To that end, and in accordance with the principles of the present invention, I provide a bypass such that when the system is called upon for normal heat exchange, fluid is pumped through the system as conventional, but during other times, some or all of the fluid is pumped through the bypass so as to divert fluid flowing out of the building loop away from the ground loop and back into the building loop. As a consequence, the energy necessary to circulate fluid through the system is substantially reduced or eliminated. Furthermore, the risk of improper heat loss or gain between the building loop and the ground loop during idle or unoccupied periods, for example, is also substantially reduced or eliminated.

The system operates by switching between a normal mode and a bypass mode. In the normal mode, transfer fluid runs from the building loop out and through the ground loop, then back into the building loop as in conventional ground source heating systems. In the bypass mode, at least some (but advantageously all) of the transfer fluid is diverted to run through the bypass instead, re-entering the building loop without first passing through the ground loop. The state of the system, including temperature data for one or more parts of the system, may be used to determine when to operate in normal mode or bypass mode.

In some embodiments, the flow rate of fluid diverted to bypass the ground loop may be greater than the flow rate of fluid circulating through the ground loop when fluid is diverted. The flow rate of fluid circulating through the ground loop when fluid is diverted advantageously drops to approximately zero, such that substantially all fluid passing through the building loop is diverted to bypass the ground loop, but may also remain above zero, such that a portion of fluid continues to circulate through the ground loop when fluid is diverted. Some amount of fluid may also be permitted to circulate through the ground loop or might be unavoidable. And while such circulation may somewhat reduce the energy savings or slightly increase the risk of unwanted heat gain or loss, the benefits of the bypass are still considered sufficient to present a substantial overall reduction in energy consumption including a reduced risk of unwanted heat gain or loss.

By virtue of the foregoing, there is thus provided a more efficient ground source heating system and method which selectively diverts fluid away from the ground loop to recirculate within the building loop at select times, reducing the energy necessary to operate the system and reducing counterproductive thermal transfer within the system.

DETAILED DESCRIPTION

The present invention overcomes the limitations and problems of prior art ground loop heating systems by including a bypass that diverts fluid away from the ground loop under certain conditions.

In many buildings, the geothermal heating system may not represent the only source of heat. Heat expelled from other refrigeration systems, heat from fuel-burning heaters, incidental heat from the sun as well as planned solar heating systems, and even exhaust heat from people and appliances may increase the temperature of the building air over and above the performance of the geothermal heat exchange system. In some cases, particularly at night, these additional sources of heat may result in a building that is warmer than the ground source from which the ground loop exchanges heat. In this case, continuing to run the transfer fluid through the ground loop can actually cool the building, in contravention of the system's purpose. Running heat exchange units during the day to heat a building for its occupant and then losing that heat during the night only to have to repeat the cycle the next day may waste considerable energy. Diverting fluid away from the ground loop to recirculate through the building loop helps to alleviate this problem. Because the system has to spend less energy reversing unwanted thermal transfer, reducing counterproductive heating and cooling during off-peak times may also potentially reduce energy demand during peak times.

In addition to reducing energy costs by reducing the amount of counterproductive heat transfer as described above, the addition of a bypass may also reduce the pump energy required to move the transfer fluid. The ground loop, which may represent hundreds or thousands of feet of pipe, may add significant resistance to the pump, and so bypassing this portion of the circuit at times would allow the pump to operate at a lower speed. In one embodiment, where the energy needed to run a pump is approximately proportional to the third power of the pump's speed, a pump speed reduction of just 10% translates into a pump energy savings of 29%. Therefore, any meaningful reduction in pump speed during off-peak times can greatly increase efficiency.

Figure 1:
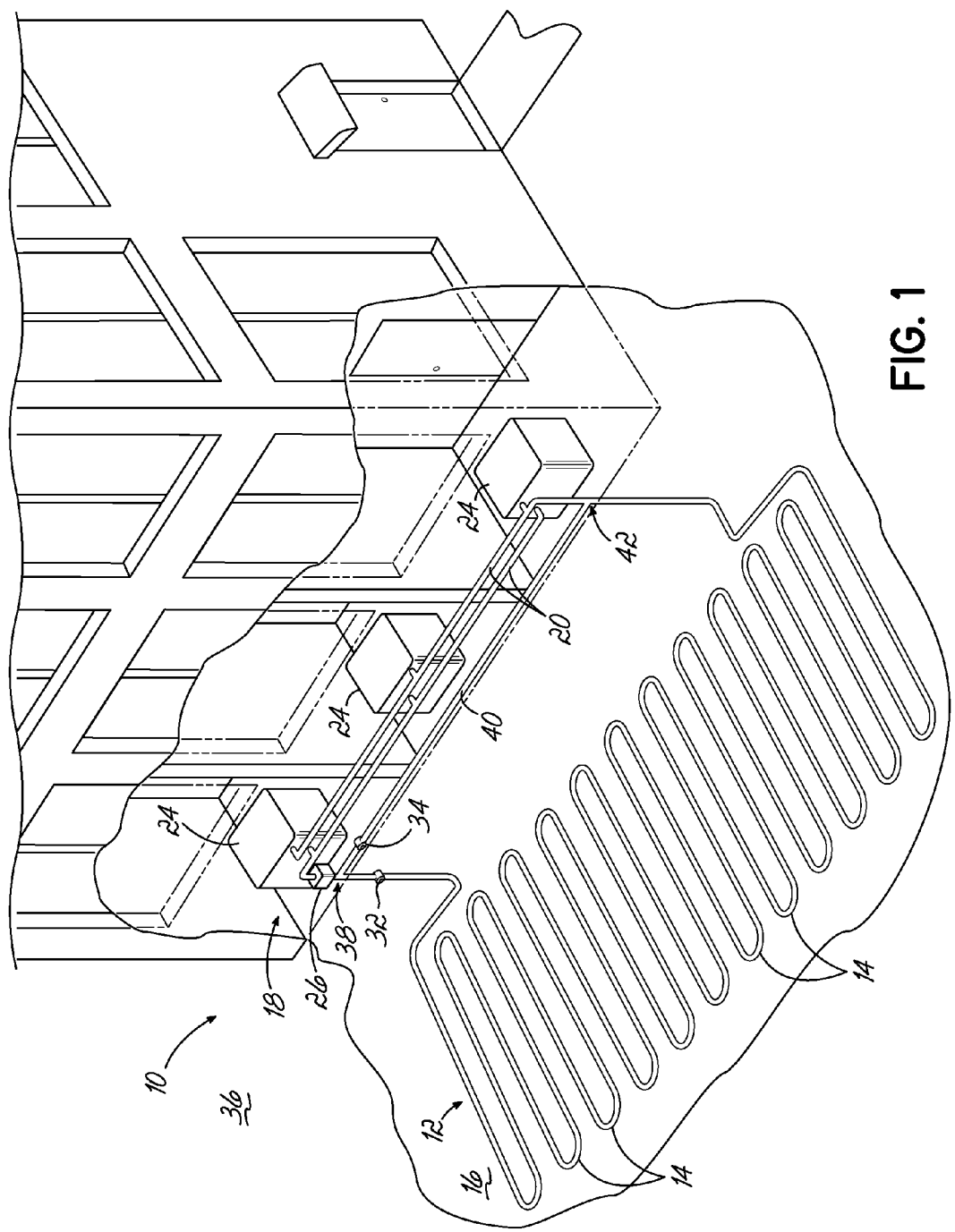
FIG. 1 is a partial perspective view of a building including an exemplary ground source heat transfer system incorporating a bypass in accordance with the principles of the present invention.
Figure 2:
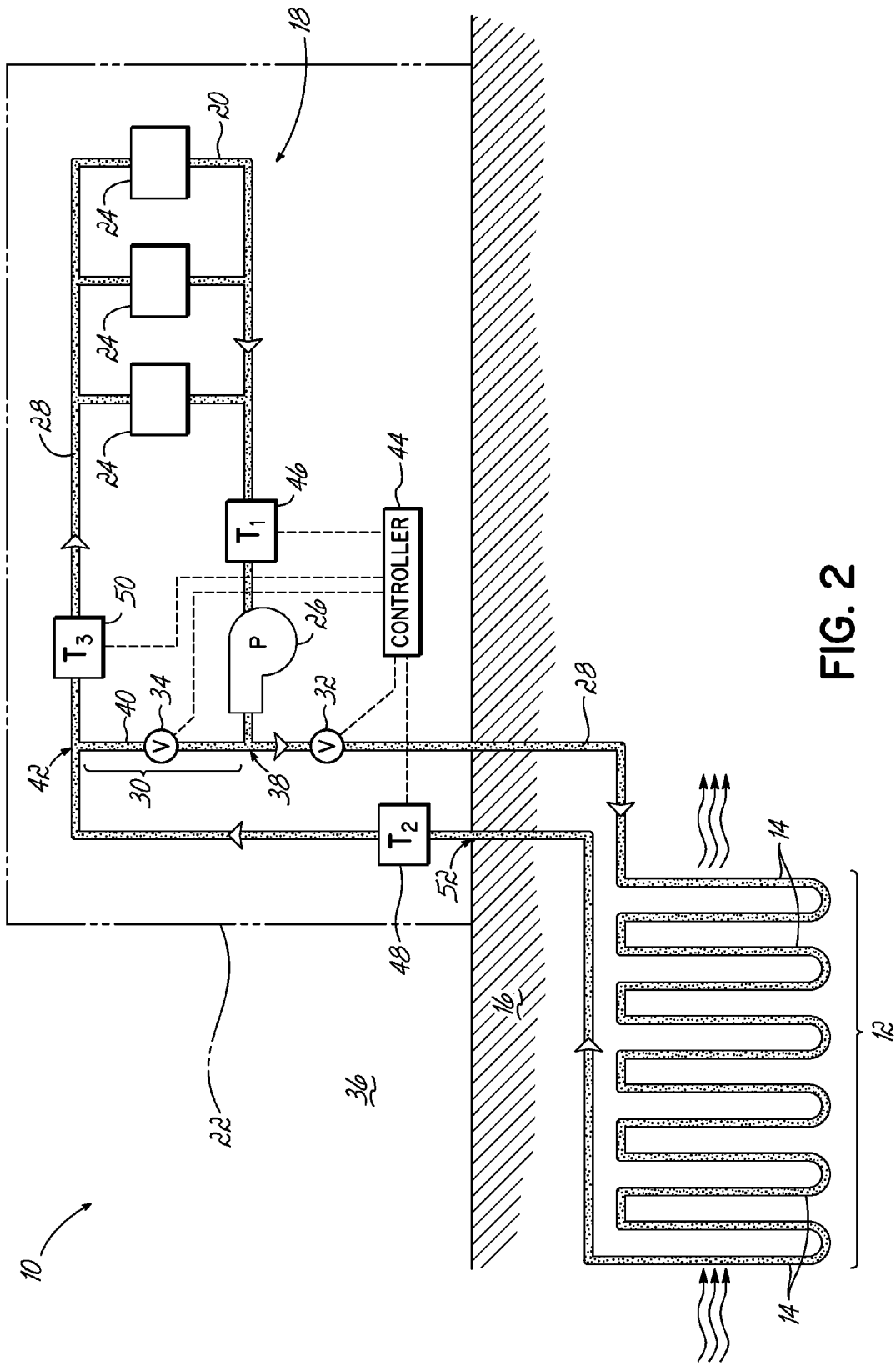
FIG. 2 is a fluid circuit diagram of the ground source heat transfer system of FIG. 1.

With reference to FIGS. 1 and 2, there is shown an exemplary ground source heating system 10 including a ground loop 12 of underground pipes 14 placed within the ground 16; a building loop 18 of building pipes 20 extending within the building 22 in thermal communication with a plurality of heat exchange units 24; and a fluid pump 26 to circulate thermal transfer fluid 28 through the pipes 14, 20. In accordance with the present invention, the system 10 also includes a bypass 30 with valves 32, 34 as further described below.

During normal operating mode of the heating system 10, geothermal transfer fluid 28, for example a water/glycol solution, is pumped through the loops 12, 18 by a fluid pump 26. The pump 26 may represent a single fluid pump or may represent a set of pumps operable to circulate the fluid; where the pump 26 functions by virtue of multiple pumps, those pumps may be positioned in different locations along the flow path of the heating system 10 in order to more adequately circulate the fluid 28. In some embodiments, the pump 26 may run twenty-four hours a day year-round.

Within the building loop 18 is connected a number of heat exchange units 24, which extract heat from the transfer fluid 28. The heat exchange units 24 may represent liquid-to-air or liquid-to-water heat pumps as known in the art. The heat exchange units 24 may support space heating and cooling, water preheating and demand heating, or any other need for heat within the building 22 where the units are deployed 24. The heat exchange units 24 may be positioned at different locations within the building 22 and be designed to serve different areas, or may collectively process the transfer fluid 28 from a common location. Although multiple heat exchange units 24 are shown, a geothermal heating system 10 as described may function with only one heat exchange unit 24 and still incorporate the features of the present invention.

The heat exchange unit 24 may operate by means of a vapor-compression refrigeration cycle as known in the art, with the heat transfer fluid 28 acting as the refrigerant, and the ground source 16 acting as a medium for heat exchange that is preferred over ambient air 36. Any other method by which a unit 24 may transfer heat between the fluid 28 and the environment to be heated or cooled may be consistent with the teachings of the present invention.

The ground loop 12 may be located within any ground-based heat source 16 known in the art. It is understood that "ground" in this context refers to any outdoor area with a significantly different temperature profile from the ambient air. The ground loop 12 moves the transfer fluid 28 through this area 16 in order to bring the transfer fluid 28 closer to the ground temperature. Ground loops 12 include horizontal loops (as exemplified in FIG. 1), vertical loops (as exemplified in FIG. 2), or a combination of both vertical and horizontal loops buried below the surface of the ground 16, or placed in a variety of natural or manmade geological features. Ground loops 12 may be buried in generally dry ground or in an area exposed to ground water, or may be immersed in a natural or artificial body of water such as a lake or river. In some embodiments, the ground loop 12 delivers water into the ground and picks up different water from a ground-based water source, such that the transfer fluid 28 is this water and the loop is termed an "open" loop. Other ground loops 12 are brought into thermal contact with the ground 16 but remain "closed"; in this case the transfer fluid 28 may be a high heat capacity mixture such as a mixture of water and an anti-freeze fluid. Although FIGS. 1 and 2 illustrate the ground loop 12 as having pipes 14 forming a single flow path, it is contemplated that the ground loop 12 could be a branching pipe system representing pipes 14 having a plurality of flow paths in parallel.

The heat exchange units 24 may be disposed and may operate separately. For example, each area of the building 22 may have its own heat exchange units 24 that operate according to the control of a thermostat (not shown) associated with that area of the building 22. The thermostats may have different settings in accordance with the preferences of the users. Even if heat exchange units 24 covering different areas have similar settings, they may still carry different temperature profiles or heating loads and may still be on or off at different times of day. Because the control of the heat exchange units 24 may potentially run at any time according to their independent control, the heat transfer fluid 28 is often made to circulate past the exchange units 24 at all times.

However, there are conditions under which the building loop 18 may be under conditions closer to the target temperature than the ground loop 12—for example, the ground loop 12 is colder than the building loop 18 when heating is desired, or the ground loop 12 is warmer than the building loop 18 when cooling is desired. Under these conditions, the continued circulation of heat transfer fluid between the building loop 18 and the ground loop 12 is undesirable. The heat transfer fluid 28 may move further from the target temperature by passing through the ground loop 12.

Under these conditions, heat transfer fluid 28 may be diverted from the ground loop 12 by means of a bypass 30 as shown. As the fluid 28 passes the junction point 38, it normally flows past an open bypass valve 32 and into the pipes 14 of the ground loop 12. However, when the system 10 is in bypass mode, the bypass valve 32 closes and the valve 34 opens. Fluid 28 flows past the now-open valve 34 into and through the pipes 40 of the bypass 30, eventually passing a second junction 42 to re-enter the pipes 20 of the building loop 18. Fluid 28 so diverted flows out of the building loop 18 and through the bypass 30 to recirculate into the building loop 18, bypassing the ground loop 12. Valves 32, 34 determine whether the bypass 30 is active at any given time, with an open valve 32 and closed valve 34 corresponding to an inactive bypass 30 where transfer fluid 28 flows into the ground loop 23 as normal, while a closed valve 32 and open valve 34 corresponds to an active bypass 30 where fluid 28 is diverted back into the building loop 18. One of ordinary skill will recognize that the function of valves 32, 34 could instead be performed by a single valve such as a two-way valve disposed at the junction 38.

The valves 32, 34 of the bypass 30 may be opened and closed in accordance with the activities of a controller 44, which may represent any manual or automated device as known in the art. As shown in FIG. 2, the controller 44 may be in communication with temperature sensors 46, 48, 50 as well as the bypass valves 32, 34. In one embodiment, the controller 44 may report temperature settings to an operator and may manipulate the bypass valves 32, 34 in accordance with operator instructions. Alternatively or in addition, the controller 44 may act according to an automated process as illustrated by the action blocks of FIG. 3.

One automated process 300 for determining whether the bypass should be active begins with a decision to run a bypass check (block 302). In one embodiment, the bypass check 302 may be run periodically such as once per hour, or may be run whenever an automated system such as the controller 44 reaches a predetermined step in a diagnostic or other operating cycle. The bypass check may be initiated manually by a user, or may run only at predetermined times of the day. The steps of the process 300 may be carried out manually or by the controller 44 (as shown in FIG. 2) or other device known in the art.

As illustrated by decision block 304, in some embodiments the bypass 30 may only be active during times of low demand, also known as off-peak times. The decision as to whether the system is on peak or off-peak may be based solely on the time of day or may be determined empirically by the current or recent usage patterns of the system 10. For example, exceeding a certain level of heat exchange unit 24 usage over a window of time prior to the bypass check could result in a determination of peak time and a decision not to use the bypass 30 (block 306). In some systems, this step is absent and whether to use the bypass 30 is based on other factors as further discussed below.

Assuming that the time of day and/or usage limitations are met, the next evaluation depends on whether the system 10 is currently understood to be within a heating mode or a cooling mode (decision block 308). This determination may be made based upon the time of year, may be made based upon one or more measured temperatures (as further described below), or may be made based upon the settings of the exchange units 24. However the system mode is determined, the relative temperature of the ground 16 is then evaluated to determine whether or not it meets this goal.

As shown in decision block 310, if the system is in a heating mode, then the ground 16 needs to be warm enough to accommodate that mode. The evaluation as to the need for the ground temperature may be measured directly by means of a temperature sensor (not shown) located in the ground. It can then be compared against a known reference temperature, or alternatively against an ambient or indoor air temperature or water temperature. However, as the primary concern of the geothermal system 10 is the temperature of the heat transfer fluid 28, a more direct method is to measure the temperature of the fluid 28 before it enters and after it leaves the ground loop 12, as shown in FIG. 2. Here a temperature sensor 46 is located downstream of the heat exchangers 24 but upstream of the junction 38 to evaluate the temperature of the transfer fluid 28 before it enters the ground loop 12, and a second temperature sensor 48 is located near the building loop inlet 52 to evaluate the temperature of the transfer fluid 28 as it leaves the ground loop 12. Where it is desired that the ground 16 is warm in order to facilitate heating, comparing the readings of the sensors 46, 48 may determine whether the ground is warm enough to leave the bypass off. Where the second temperature sensor 48 reads a higher temperature than the first temperature sensor 46, the bypass 30 shuts off (block 314); where the first temperature sensor 46 reads higher, the bypass 30 turns on (block 316). A third temperature sensor 50, located downstream of the junction 42, may also communicated temperature measurements $T_3$ to the controller 44 which are used as further described below.

One of ordinary skill will recognize that, in order to avoid a rapidly fluctuating valve 32, 34 in response to minor changes near the critical point in temperature, a threshold difference might be required to either turn the bypass 30 on when it is inactive or shut the bypass 30 off when it is active, and that these values may differ from those required to leave the bypass 30 in its current state (whether active or inactive). In one embodiment, the bypass 30 may only turn on when the reading of the first temperature sensor 46 exceeds the reading of the second sensor 48 by at least 3 degrees, but may then remain on until the reading of the second sensor 48 exceeds the reading of the first sensor 46, and not shut off immediately when the temperature difference drops below the 3 degree mark. FIG. 4A illustrates this logic process through the use of supplemental flowchart 400, which can be seen as one embodiment of decision block 310 from FIG. 3. Here, if the bypass 30 is active (block 402), then the difference between the reading of the second sensor 48 (represented by $T_2$) and the first sensor 46 (represented by $T_1$) is compared to a first reference value $C_1$ (decision block 404). The bypass 30 stays active (block 402) until the heat difference ($T_2-T_1$) exceeds the reference value $C_1$, at which point the bypass shuts off (block 406). If the bypass 30 is inactive, it remains inactive (block 408) until the temperature difference ($T_2-T_1$) drops below a second reference value $C_2$ (decision block 410), at which point the bypass 30 turns on (block 412). The supplemental flowchart 400 is represented as a continuous loop, although if used as part of the bypass check process illustrated by flowchart 300, the process may only run through once, from initiation at a status block 402 or 408 until it returns to one of those two status blocks 402 or 408.

Figure 3:
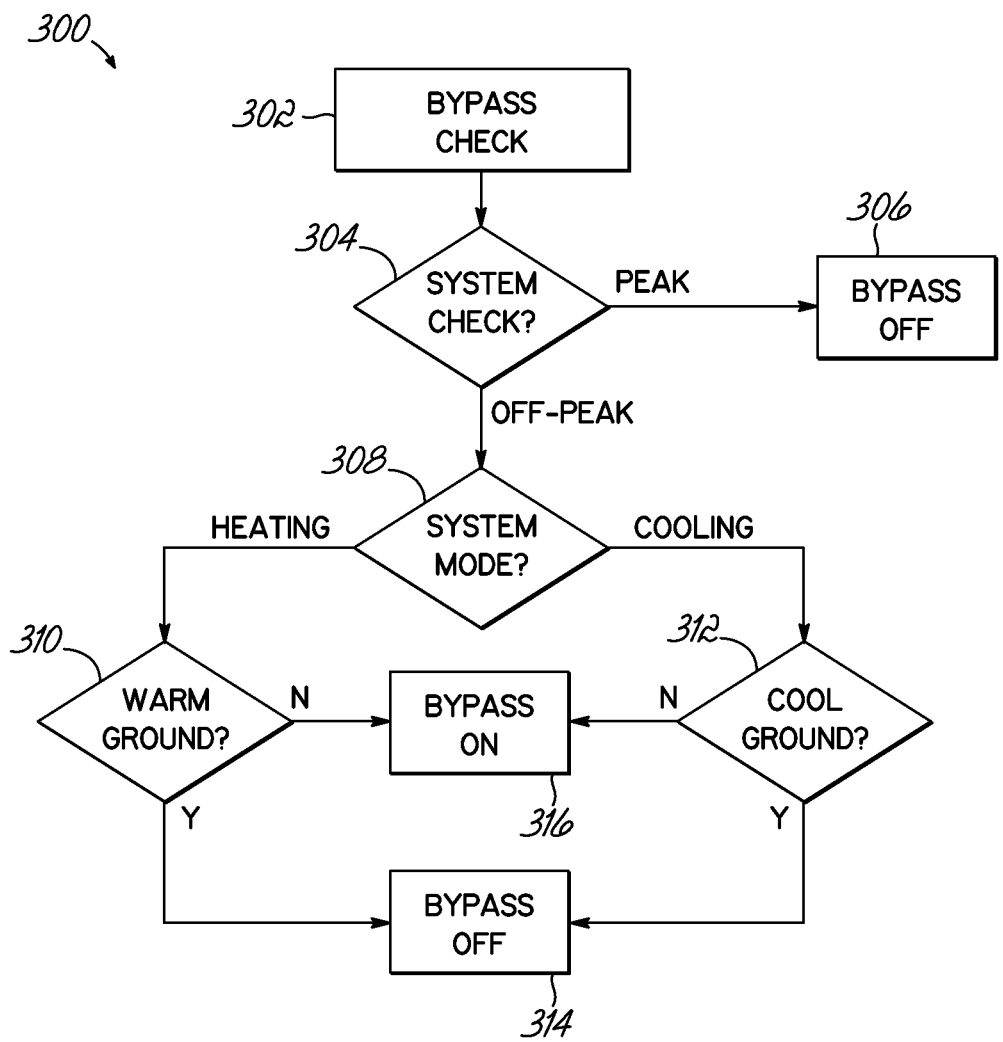
FIG. 3 is a block diagram of a control process for activating or deactivating the bypass of the system of FIG. 1.
Figure 4A:
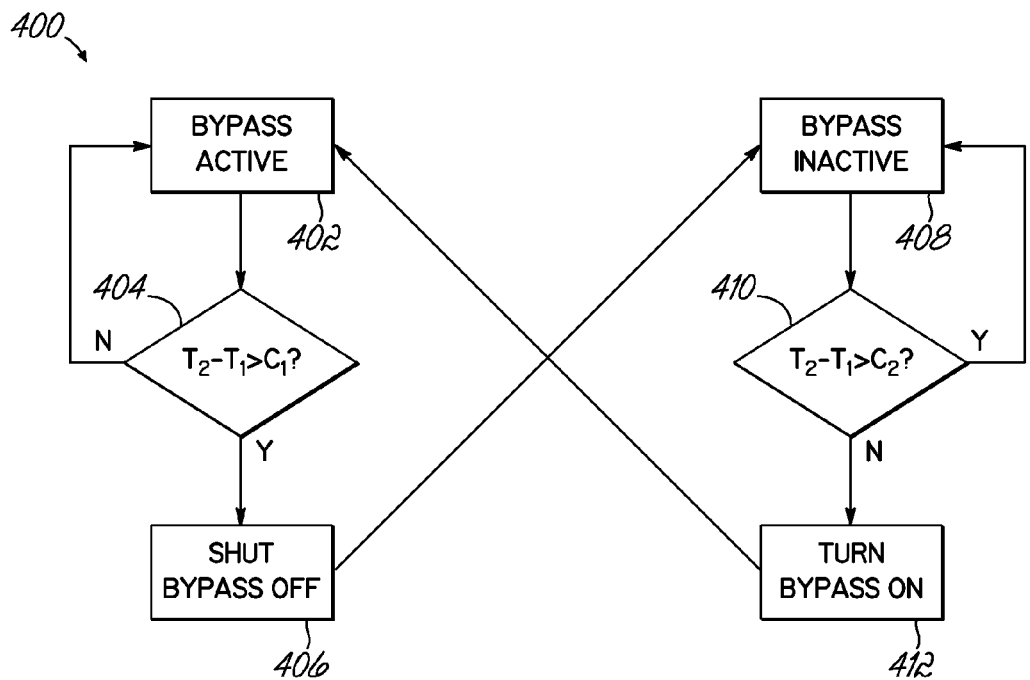
FIG. 4A is a block diagram of a control process for use during a heating mode of the system of FIG. 1.
Figure 4B:
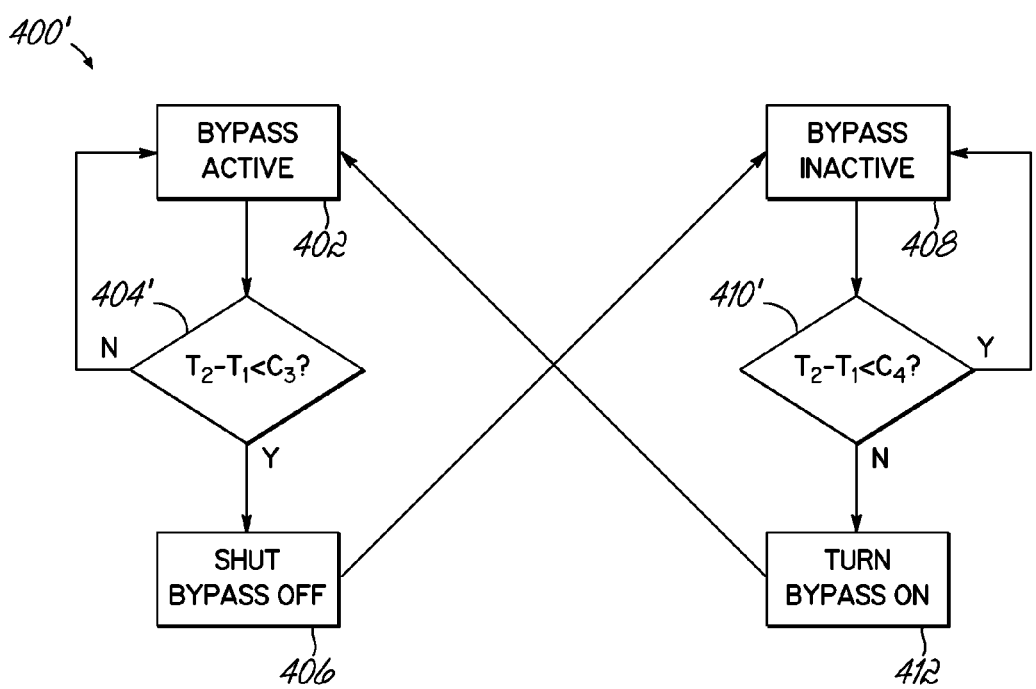
FIG. 4B is a block diagram of a control process for use during a cooling mode of the system of FIG. 1.

Returning to the previous decision block 308 of flowchart 300 in FIG. 3, if the system 10 is understood to be in cooling mode, then the critical values are reversed. A lower reading for the second temperature sensor 48 than the first sensor 46 reflects ground 16 at a desired temperature and the bypass 30 can be inactive, while a higher reading for the second sensor 48 than the first 46 represents ground 16 that is warmer than desired and conditions where the bypass 30 may be active. If reference values are used in comparing temperature differences, these may be the same as the reference values associated with the heating cycle or may be different values. FIG. 4B illustrates by means of a supplemental flowchart 400' how the same process may be used as described above, only with reversed signs for the equations and possibly different reference values C3, C4, so that the equations associated with decision blocks 404' and 410' are different than the equations in blocks 404 and 410 described above.

As the temperature $T_2$ may be measured based on transfer fluid 48 exiting the pipes 14 of the ground loop 12, it may be recognized that these temperature measurements may not be available when the bypass 30 is active, and that other methods may be necessary to determine when the bypass 30 should be shut off. For example, temperature measurements of the ground source 16, ambient air 36, or building 22 may be used in addition to the temperature measurements used above. Alternatively, a periodic evaluation may include briefly increasing the fluid flow through the ground loop 12 in order to evaluate the temperature of the transfer fluid 28 as discussed above. Even in the advantageous case of a complete lack of fluid flow past the temperature sensor 48, the temperature $T_2$ of the fluid 28 left in the pipes 20 near the sensor 48 may continue to be used. Alternatively, further comparisons involving the temperature $T_2$ may be based on the last temperature $T_2$ taken before the bypass 30 was active, or on another reference value. The third temperature sensor 50 and temperature measurements $T_3$ may also be used to determine whether the system 10 should be in its normal or bypass mode.

In some embodiments, a portion of the fluid 28 will continue to flow through the ground loop 12 even while much of the fluid is diverted into the bypass 30. It will be recognized that some minimal fluid flow through the ground loop 12 may prevent damage to the pipes 14 and allow continued temperature measurements $T_2$ as described above while still allowing the system 10 to benefit from use of the bypass 30. Similarly, it will be understood that in some embodiments, a portion of the fluid 28 may continue to flow through the bypass pipes 40 even when the bypass 30 is inactive.

It will be recognized that a given embodiment of this system may be more limiting than the above—for instance, a ground-source system may be configured to work only in a heating mode or a cooling mode, in which case the logic to determine which mode the system is in would be unnecessary. Similarly, the decision to switch between a heating mode and cooling mode may be made manually, and in one embodiment may occur only during a perceived transition in seasonal weather patterns.

Although illustrated in FIGS. 1 and 2 as a region of pipe 40, one of ordinary skill will recognize that the bypass 30 may represent other methods of fluid conveyance known in the art. For example, the bypass 30 may itself represent a branching valve capable of diverting fluid flow from the ground loop 12 directly back into the building loop 18 while using little or no independent pipe 40 not found in the ground loop 12. One of ordinary skill in the art will also recognize that the fluid conveyance circuit diagram of FIG. 2 is an illustration which is not designed to be limiting as to the relative positions, numbers, or sizes of various elements, and that one of ordinary skill will take a variety of structural and fluid dynamic considerations into account when designing each system without departing from the teachings of the present invention.

Many features have been listed with particular configurations, options, and embodiments. Any one or more of the features described may be added to or combined with any of the other embodiments or other standard devices to create alternate combinations and embodiments.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. For example, it is contemplated that the bypass 30 which is discussed above as present within the building 22 could instead be within the ground loop 12 in order to bypass a portion of the ground loop 12. A bypass 30 within the ground loop 12 could act to significantly shorten the flow path of the transfer fluid 28 during a bypass mode of operation without completely removing the ground loop 12 from the flow path. It is also contemplated that multiple bypasses 30 could be included at different locations in the heating system 10, and that such bypasses 30 might be activated in tandem or separately to respond to different conditions in parts of the heating system 10. The invention in its broader aspects is therefore not limited to the specific details, representative apparatus and methods and illustrative examples shown and described. Accordingly, departures may be made from such details without departing from the scope or spirit of applicant's general inventive concept.

What is claimed is:

1. A ground source heat transfer system, comprising:
a ground loop positioned within a ground source;
a building loop positioned within a building;
a bypass positioned at least in part within the building;
a heat exchange unit in thermal communication with the building loop;
a fluid pump coupled to the ground loop, the building loop, and the bypass, the fluid pump configured to:
  operate in a normal mode of the system to circulate a fluid between and through the ground loop and the building loop to facilitate heat transfer between the ground source and the heat exchange unit, and
  operate in a bypass mode of the system to circulate a portion of the fluid within the building between and through the bypass and the building loop whereby the transfer of heat between the ground source and the heat exchange unit is reduced;
first and second temperature sensors configured to measure a temperature of the fluid at different points; and
a controller is configured to:
  compare temperature data representative of the temperature measured from the first temperature sensor to temperature data representative of the temperature measured from the second temperature sensor;
  switch the system from the normal mode to the bypass mode only when the compared temperature data satisfies predefined parameters;
  switch the system to the bypass mode only when a difference between the first temperature sensor and the second temperature sensor exceeds a predetermined heating setting reference value when the controller is in a heating setting; and
  switch the system to the bypass mode only when the difference between the first temperature sensor and the second temperature sensor remains below a predetermined cooling setting reference value when the controller is in a cooling setting.

2. The system of claim 1, wherein the bypass is operable in the bypass mode of the system to divert fluid flowing out of the building loop away from the ground loop so as to directly recirculate the fluid into the building loop.

3. The system of claim 1,
wherein, when the controller is in the heating setting, the controller switches the system from the normal mode to the bypass mode when a difference between the first temperature sensor and the second temperature sensor exceeds a first predetermined heating setting reference value, and the controller switches the system from the bypass mode to the normal mode when the difference between the first temperature sensor and the second temperature sensor falls below a second predetermined heating setting reference value that is lower than the first predetermined heating setting reference value; and
wherein, when the controller is in the cooling setting, the controller switches the system from the normal mode to the bypass mode when the difference between the first temperature sensor and the second temperature sensor falls below a first predetermined cooling setting reference value, and the controller switches the system from the bypass mode to the normal mode when the difference between the first temperature sensor and the second temperature sensor exceeds a second predetermined cooling setting reference value that is higher than the first predetermined cooling setting reference value.

4. The system of claim 1, the bypass positioned completely within the building.

5. The system of claim 1, the fluid pump running twenty-four hours per day in either of the normal mode of the system or the bypass mode of the system such that the fluid continuously circulates through at least the building loop in the bypass mode.

6. The system of claim 1, wherein the controller is further configured to:
monitor the system to detect conditions unsuitable for circulating fluid through the ground loop and divert fluid in response to the detection of said unsuitable conditions,
wherein the unsuitable conditions consist of at least one of the following: the temperature of the fluid in the ground loop being colder than the temperature of the fluid in the building loop when heating is desired; the temperature of the fluid in the ground loop being warmer than the temperature in the building loop when cooling is desired; and, an off-peak period of time when usage of the heating setting or cooling setting is less than during a corresponding peak period.

7. The system of claim 6, wherein the conditions include the temperature of the fluid entering the ground loop from the building loop and the temperature of the fluid exiting the ground loop to the building loop.

8. A method for operating a ground source heat transfer system having a ground loop positioned within a ground source, a building loop positioned within a building, and a heat exchange unit in thermal communication with the building loop, the method comprising:
circulating fluid between and through the building loop and the ground loop in order to facilitate heat transfer between the ground source and the heat exchange unit when in a normal mode; and
diverting fluid within the building to circulate the fluid through the building loop and at least partially bypassing the ground loop whereby the transfer of heat between the ground source and the heat exchange unit is reduced when in a bypass mode;
measuring, by a first temperature sensor and a second temperature sensor, a temperature of the fluid at different points;
comparing temperature data from the first temperature sensor to data from the second temperature sensor;
switching between the normal mode to the bypass mode when the compared temperature data satisfies predetermined parameters;
operating in the bypass mode only when a difference between the first temperature sensor and the second temperature sensor exceeds a predetermined heating setting reference value when in a heating setting; and
operating in the bypass mode only when the difference between the first temperature sensor and the second temperature sensor remains below a predetermined cooling setting reference value when in a cooling setting.

9. The method of claim 8, further comprising:
monitoring the system to detect conditions unsuitable for circulating fluid through the ground loop and diverting fluid in response to the detection of said unsuitable conditions,
wherein the unsuitable conditions consist of at least one of the following: the temperature of the fluid in the ground loop being colder than the temperature of the fluid in the building loop when heating is desired; the temperature of the fluid in the ground loop being warmer than the temperature in the building loop when cooling is desired; and, an off-peak period of time when usage of the heating setting or cooling setting is less than during a corresponding peak period.

10. The method of claim 8, wherein the flow rate of fluid diverted to bypass the ground loop is greater than the flow rate of fluid circulating through the ground loop when fluid is diverted.

11. The method of claim 10, wherein the flow rate of fluid circulating through the ground loop when fluid is diverted drops to zero.

12. The method of claim 10, wherein a portion of fluid continues to circulate through the ground loop when fluid is diverted.

13. The method of claim 8, further comprising:
continually circulating fluid within the building loop such that the speed of fluid circulating through the building loop never drops to zero.

14. The method of claim 13, wherein the system further comprises a fluid pump operable to circulate the fluid, the method further comprising:
reducing the speed of the fluid pump when fluid is diverted.

15. A ground source heat transfer system, comprising:
a ground loop positioned within a ground source;
a building loop;
a bypass;
a heat exchange unit in thermal communication with the building loop; and
a fluid pump coupled to the ground loop, the building loop, and the bypass, the fluid pump configured to:
run 24 hours per day in either of a normal mode of the system or a bypass mode of the system,
circulate a fluid between and through the ground loop and the building loop to facilitate heat transfer between the ground source and the heat exchange unit when operating in the normal mode,
circulate a portion of the fluid between and through the bypass and the building loop whereby the transfer of heat between the ground source and the heat exchange unit is reduced while fluid is continuously circulating through at least the building loop when operating in the bypass mode;
first and second temperature sensors configured to measure the temperature of the fluid at different points
a controller configured to:
compare temperature data from the first temperature sensor to temperature data from the second temperature sensor;
switch the system from the normal mode to the bypass mode only when the compared temperature data satisfies predefined parameters,
switch the system to the bypass mode only when a difference between the first temperature sensor and the second temperature sensor exceeds a predetermined heating setting reference value when the controller is in a heating setting, and
switch the system to the bypass mode only when a difference between the first temperature sensor and the second temperature sensor remains below a predetermined cooling setting reference value when the controller is in a cooling setting.

16. A ground source heat transfer system for exchanging heat between a building environment within a building and a ground environment associated with a ground source, comprising:
a ground loop positioned within the ground source and being in thermal communication with the ground environment;

a building loop positioned within the building and being in thermal communication with the building environment;

a bypass, the building environment, the ground environment, and the bypass being thermally separate from an ambient air environment external to the building and the ground source; and a fluid pump coupled to the ground loop, the building loop, and the bypass, the fluid pump operable in a normal mode of the system to circulate a fluid between and through the ground loop and the building loop to facilitate heat transfer between the ground environment and the building environment, the fluid pump operable in a bypass mode of the system to circulate a portion of the fluid between and through the bypass and the building loop whereby the transfer of heat between the ground environment and the building environment is reduced;

a controller operable to switch the system between the normal mode and the bypass mode and to control the system in either mode; and first and second temperature sensors operable to measure the temperature of the fluid at different points, both temperature sensors operable to transmit temperature data to the controller, wherein the controller is operable to compare temperature data from the first temperature sensor to temperature data from the second temperature sensor and to switch the system from the bypass mode only when the compared temperature data satisfies predefined parameters;

wherein, when the controller is in a heating setting, the system runs in the bypass mode only when a difference between the first temperature sensor and the second temperature sensor exceeds a predetermined heating setting reference value; and wherein, when the controller is in the cooling setting, the system runs in the bypass mode only when the difference between the first temperature sensor and the second temperature sensor remains below a predetermined cooling setting reference value.

* * * * *